(12) United States Patent
Chen et al.

(10) Patent No.: US 11,806,803 B2
(45) Date of Patent: Nov. 7, 2023

(54) ELECTROMAGNETIC PULSE-AIDED FRICTION STIR LOCK WELDING PROCESSING DEVICE AND METHOD

(71) Applicant: Nanchang Hangkong University, Nanchang (CN)

(72) Inventors: Yuhua Chen, Nanchang (CN); Timing Zhang, Nanchang (CN); Jinyang Hu, Nanchang (CN); Jilin Xie, Nanchang (CN); Shanlin Wang, Nanchang (CN); Limeng Yin, Nanchang (CN); Jinzhong Lu, Nanchang (CN); Gang Wang, Nanchang (CN); Kaiyu Luo, Nanchang (CN); Jiaming Ni, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 0 days.

(21) Appl. No.: 18/113,068

(22) Filed: Feb. 23, 2023

(65) Prior Publication Data

US 2023/0191529 A1 Jun. 22, 2023

(30) Foreign Application Priority Data

Jun. 8, 2022 (CN) .......................... 202210644668.4

(51) Int. Cl.
*B23K 20/00* (2006.01)
*B23K 20/26* (2006.01)
*B21D 37/10* (2006.01)
*B23K 20/12* (2006.01)

(52) U.S. Cl.
CPC .............. *B23K 20/26* (2013.01); *B21D 37/10* (2013.01); *B23K 20/123* (2013.01)

(58) Field of Classification Search
CPC .............. B23K 20/122; B23K 20/1255; B23K 20/1235; B23K 20/24; B23K 20/26; B23K 20/12; B23K 20/123
See application file for complete search history.

(56) References Cited

U.S. PATENT DOCUMENTS

| | | | | |
|---|---|---|---|---|
| 8,544,714 | B1 * | 10/2013 | Obaditch | B23K 20/123 228/2.1 |
| 9,925,622 | B2 * | 3/2018 | Kanemaru | B23K 9/1735 |
| 9,964,944 | B2 * | 5/2018 | Adair | G05B 19/4145 |
| 2002/0011509 | A1 | 1/2002 | Nelson et al. | |
| 2004/0134972 | A1 | 7/2004 | Nelson et al. | |
| 2009/0001131 | A1 | 1/2009 | Sunahara et al. | |

(Continued)

FOREIGN PATENT DOCUMENTS

| | | |
|---|---|---|
| CN | 107199394 A | 9/2017 |
| CN | 108856443 A | 11/2018 |
| CN | 208289214 U | 12/2018 |

*Primary Examiner* — Erin B Saad

(57) ABSTRACT

The present invention discloses an electromagnetic pulse-aided friction stir lock welding processing device and method, which comprises an upper die body and a lower die body. The upper end of the lower die body is provided with a frustum-shaped settling tank. The lower end of the upper die body is provided with a tip inserted into the settling tank, an outer wall of the tip is fitted with an inner wall of the settling tank, a gap for placing parts to be processed is arranged between the upper die body and the lower die body.

1 Claim, 7 Drawing Sheets

(56) References Cited

U.S. PATENT DOCUMENTS

| | | | |
|---|---|---|---|
| 2010/0326962 A1* | 12/2010 | Calla | B23K 26/0344 |
| | | | 219/76.1 |
| 2011/0099808 A1* | 5/2011 | Imamura | B23K 20/1265 |
| | | | 29/761 |
| 2015/0360317 A1* | 12/2015 | Kalvala | B23K 35/0261 |
| | | | 228/2.3 |
| 2019/0111514 A1* | 4/2019 | Matsushita | B23K 20/1225 |
| 2019/0283174 A1* | 9/2019 | Onose | B23K 11/04 |
| 2020/0306871 A1* | 10/2020 | Matsushita | B23K 20/24 |

* cited by examiner

ELECTROMAGNETIC PULSE-AIDED FRICTION STIR LOCK WELDING PROCESSING DEVICE AND METHOD

TECHNICAL FIELD

The present invention relates to the technical field of lock welding processing, and particularly relates to an electromagnetic pulse-aided friction stir lock welding processing device and method.

BACKGROUND

Electromagnetic riveting is a riveting technology in which a rivet generates plastic deformation by eddy repulsion produced between coils. With the lightweight development of aviation and automobile manufacturing, the introduction of rivets will undoubtedly increase the quality and cost of connected components, which is very unfavorable to the lightweight of connected structures. Therefore, in the field of plate connection, there is an urgent need for a connection technology without rivet, which can connect metal plates with high strength. It is easy to control the sheet forming in the process of connection, and is incapable of producing damage phenomena such as cracks. During processing of a lock welding structure in the prior art, ultrasonic vibration-aided electromagnetic lock welding devices are mainly used. The devices basically have no heat source, and the plastic deformation of the plates is difficult. The effect of superimposed ultrasonic vibration-aided forming is limited, and an ideal mechanical lock structure cannot be fully formed.

SUMMARY

In view of the above defects in the prior art, the present invention provides an electromagnetic pulse-aided friction stir lock welding processing device and method. Plastic metal is generated around a stirring needle while welding spots are formed by stirring and rotating at high speed, which is conducive to forming a mechanical lock structure by pulsed magnetic field force, so as to obtain a good connection structure.

To achieve the above invention purpose, the present invention adopts the following technical solution:

An electromagnetic pulse-aided friction stir lock welding processing device is provided, comprising an upper die body and a lower die body. The upper end of the lower die body is provided with a frustum-shaped settling tank, which is a big-end-up structure. The lower end of the upper die body is provided with a tip inserted into the settling tank, an outer wall of the tip is fitted with an inner wall of the settling tank, a gap for placing parts to be processed is arranged between the upper die body and the lower die body. The middle of the upper die body is provided with a first stirring head, the first stirring head penetrates through a first through hole formed in the middle of the upper die body. The middle of the settling tank is provided with a second stirring head, the second stirring head penetrates through a second through hole formed in the lower die body and extends into the settling tank, the end part of the second stirring head is flush with the height of upper surface of the lower die body. The first stirring head and the first through hole are in clearance fit and the second stirring head and the second through hole are in clearance fit. Electromagnetic coils are symmetrically arranged on the side wall of the settling tank, and the electromagnetic coils are connected with a power supply circuit.

Further, the power supply circuit comprises a transformer T and a capacitor C which are connected with each other in parallel. Both ends of the capacitor C are connected with the electromagnetic coils. A resistor R, an inductor L, and a discharge switch are arranged between the capacitor C and the electromagnetic coils. A diode VD is arranged between the transformer T and the capacitor C.

Further, the size of the first stirring head is greater than the size of the second stirring head.

Further, the second stirring head and the first stirring head are installed on a second rotating device and a first rotating device, respectively. The second rotating device and the upper die body are respectively arranged on a lifting device, and rotation directions of the second stirring head and the first stirring head are opposite.

Further, electrodes are arranged in the second stirring head and the first stirring head. The electrodes are connected with a power supply through wires. The wires are connected with the second stirring head and the first stirring head through an electric brush. The electric brush is installed on a surface connected with the second stirring head and the first stirring head.

A processing method for the electromagnetic pulse-aided friction stir lock welding processing device is provided, comprising the following steps:

S1: placing two stacked metal plates to be processed on the upper end of the lower die body, making a predetermined processing point located above the settling tank, and making the upper die body, the first stirring head and the second stirring head come into contact and extrude the metal plates.

S2: driving the second stirring head and the first stirring head to rotate at set speed V, and making the rotation directions of the second stirring head and the first stirring head opposite.

S3: under the friction and extrusion action of the first stirring head and the second stirring head, forming a heat-affected zone between the two metal plates through a heating effect, forming a nugget at the center of the heat-affected zone, and connecting the two metal plates by the nugget.

S4: driving the upper die body to decline by the lifting device; under the extrusion action of the upper die body, producing plastic deformation by the two metal plates, and squeezing the heat-affected zone into the settling tank until the metal in the heat-affected zone fills the settling tank.

S5: in the deformation process of the two metal plates, forming a convex lock welding structure through the thimble action of the second stirring head, wherein the inner surface of the convex lock welding structure is a cylindrical structure.

S6: then, driving, by the lifting device, the second stirring head to draw out the settling tank; raising the upper die body to leave the settling tank; after the capacitor C is fully charged by the transformer, instantaneously closing the discharge switch, discharging to the electromagnetic coils by the capacitor C so that transient alternating current is produced and flows through the electromagnetic coils, and producing a strong alternating magnetic field.

S7: generating induced current opposite to the current of the electromagnetic coils on the surfaces of the metal plates by the strong alternating magnetic field; generating an induced magnetic field by the induced current to prevent the magnetic field of the electromagnetic coils from penetrating through the metal plates; generating time-dependent mutually exclusive magnetic field forces between the electromagnetic coils and the metal plates; and generating a repulsive force among the electromagnetic coils and both sides of the lower end of the convex lock welding structure so that the lower end of the convex lock welding structure is rapidly deformed and furled inwards to form a mechanical lock welding structure.

Further, the step S3 comprises:

S31: under the friction and extrusion action of the first stirring head and the second stirring head, forming a heat-affected zone between the two metal plates through a heating effect, and forming a nugget at the center of the heat-affected zone;

S32: shooting thermal imaging photos of the metal plates by a thermal imaging camera at set time t;

S33: evenly dividing the photos into a plurality of sub-photos, and calculating the temperature value $T_n$: $T_n = (t_1+t_2+ \ldots +t_a)/a$ corresponding to each sub-photo by using the temperature value $t_n$ corresponding to each pixel in the photo, wherein a is the number of pixels contained in each sub-photo and $t_a$ is the temperature value corresponding to each pixel in each sub-photo;

S34: finding a maximum temperature value $T_{nmax}$ of the temperature values corresponding to all the sub-photos; taking a center of the sub-photo corresponding to the maximum temperature value $T_{nmax}$ as an origin o which is the center of the nugget; and establishing a coordinate system xoy on a plane where the photo is located;

S35: comparing the temperature value $T_{nmax}$ corresponding to all the sub-photos with minimum temperature $T_1$ according to minimum heating temperature $T_1$ at which the metal plates form a satisfactory nugget; if $T_n \geq T_1$, determining that the nugget can be formed at a region of the sub-photo; and if $T_n < T_1$, determining that the nugget cannot be formed at the region of the sub-photo;

S36: screening out sub-photos that the nugget can be formed, and marking the positions of the sub-photos that the nugget can be formed in the coordinate system xoy to form a nugget region that takes the origin o as a starting point and diffuses to a periphery;

S37: connecting the centers of the outermost sub-photos in the nugget region to form a closed nugget region pattern, and acquiring coordinates of the center of each sub-photo at the boundary of the nugget region pattern in the coordinate system xoy to obtain a coordinate group $A=\{(x_1, y_1), (x_2, y_2), \ldots, (x_b, y_b)\}$ for calculating the area of the nugget region pattern, wherein b is the number of the sub-photos distributed at the boundary of the nugget region pattern;

S38: calculating the area S of the nugget region pattern by using the coordinate group A:

$$S = \frac{1}{2}\sum_{i=1}^{b} x_i(y_{i+1} - y_{i-1})$$

wherein i is any coordinate in the coordinate group A;

S39: comparing the area S with a threshold S of the area of the nugget required by the processing;

if $S \geq S_{threshold}$, determining that a stable nugget is formed between the two metal plates and processing requirements are satisfied; and executing step S4;

if $S < S_{threshold}$, determining that an unstable nugget is formed between the two metal plates and the processing requirements are not satisfied; increasing the extrusion pressure of the first stirring head and the second stirring head on the two metal plates, or increasing the rotational speed of the first stirring head and the second stirring head; returning to step S31; and promoting the formation of a nugget which satisfies the processing requirements between the two metal plates.

The present invention has the beneficial effects: the present invention firstly makes the two metal plates produce plastic deformation through extrusion in a mode of frictional heating to form a preliminary lock welding structure, and then uses the mutual magnetic field force between the electromagnetic coils and the metal plates to form a stable lock welding structure. In the process of frictional heating, the nugget is formed between the two metal plates. The present invention uses the thermal imaging principle to monitor the forming process of the nugget in real-time to ensure that the area formed by the nugget meets the design requirements, and adjusts a frictional state according to the monitoring results so that processing accuracy is high, the mechanical properties of the lock welding structure is obviously improved, and high connection strength, easy control, high efficiency, and simple operation are achieved.

Wherein 1 upper die body; 2 first stirring head; 3 metal plate; 4 heat-affected zone; 5 lower die body; 6 electromagnetic coil; 7 settling tank; 8 second stirring head; 9 nugget; 10 electric brush; 11 electrode; 12 power supply.

DETAILED DESCRIPTION

Specific embodiments of the present invention are described below to facilitate those skilled in the art to understand the present invention. However, it should be understood that the present invention is not limited to the scope of the specific embodiments. For those ordinary skilled in the art, as long as various changes are within the spirit and scope of the present invention defined and determined by the attached claims, these changes are obvious. All inventions which utilize the conception of the present invention are protected.

Figure 1:
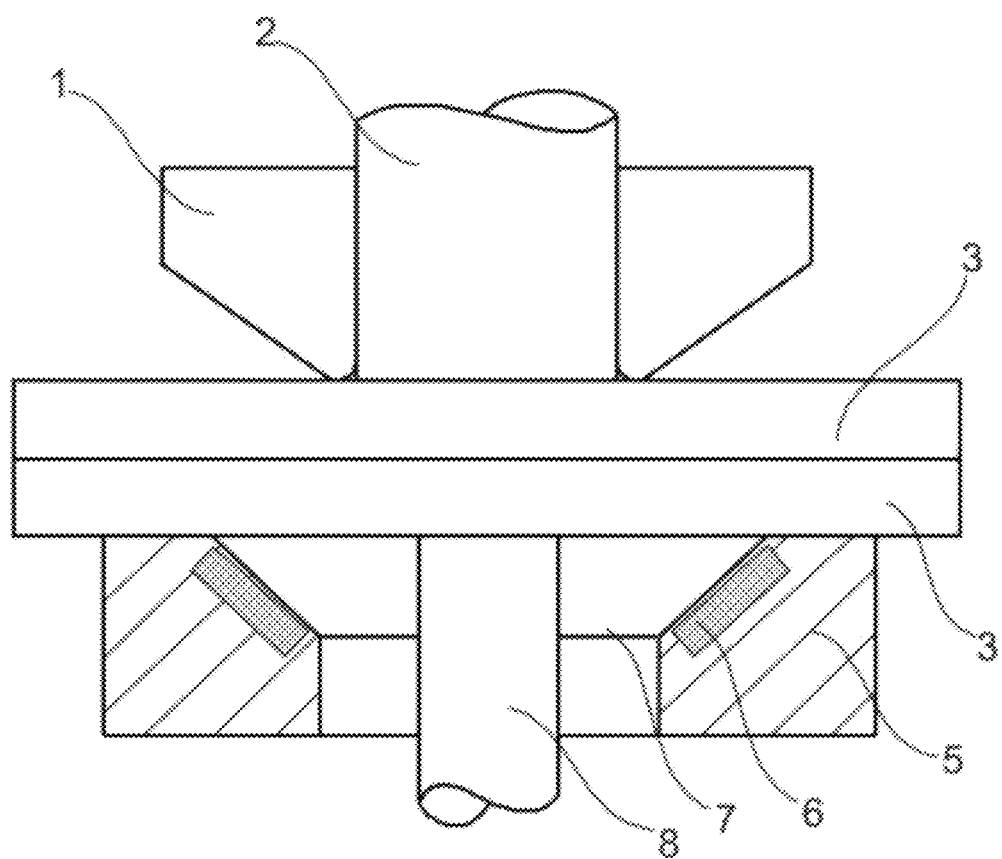
FIG. 1 shows an electromagnetic pulse-aided friction stir lock welding processing device.
Figure 2:
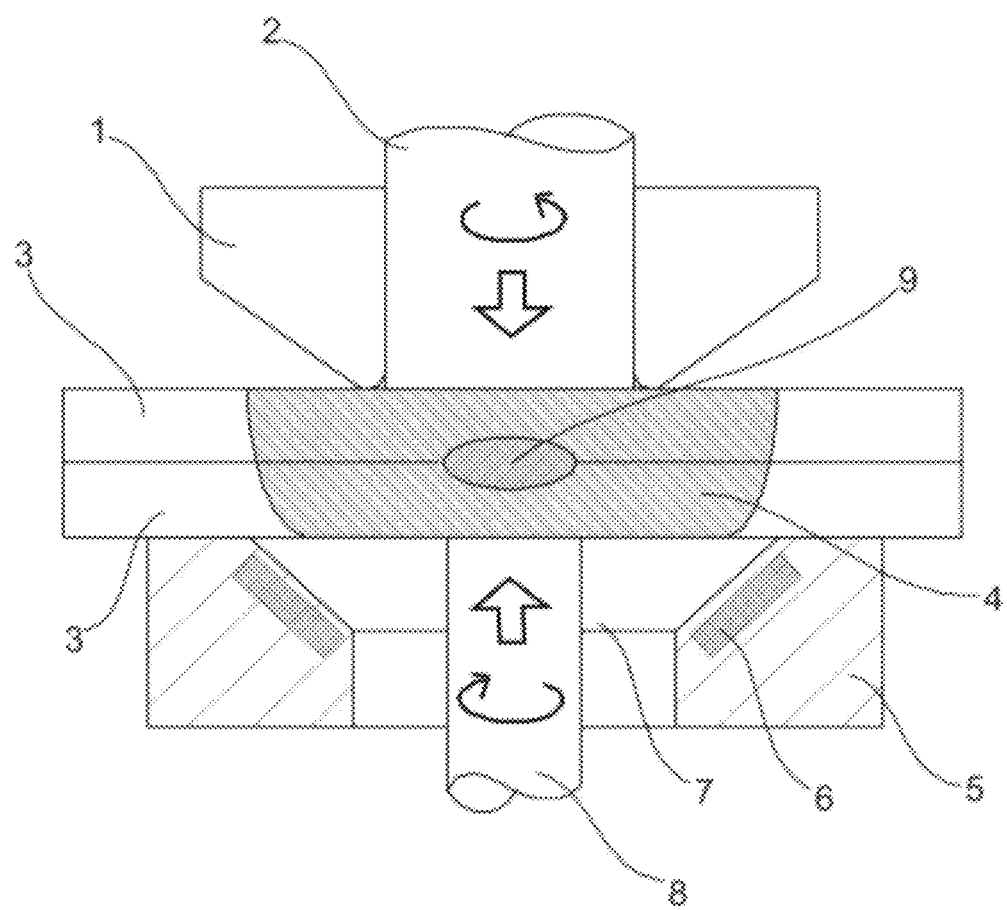
FIG. 2 is a structural diagram of a nugget formed between two metal plates.
Figure 3:
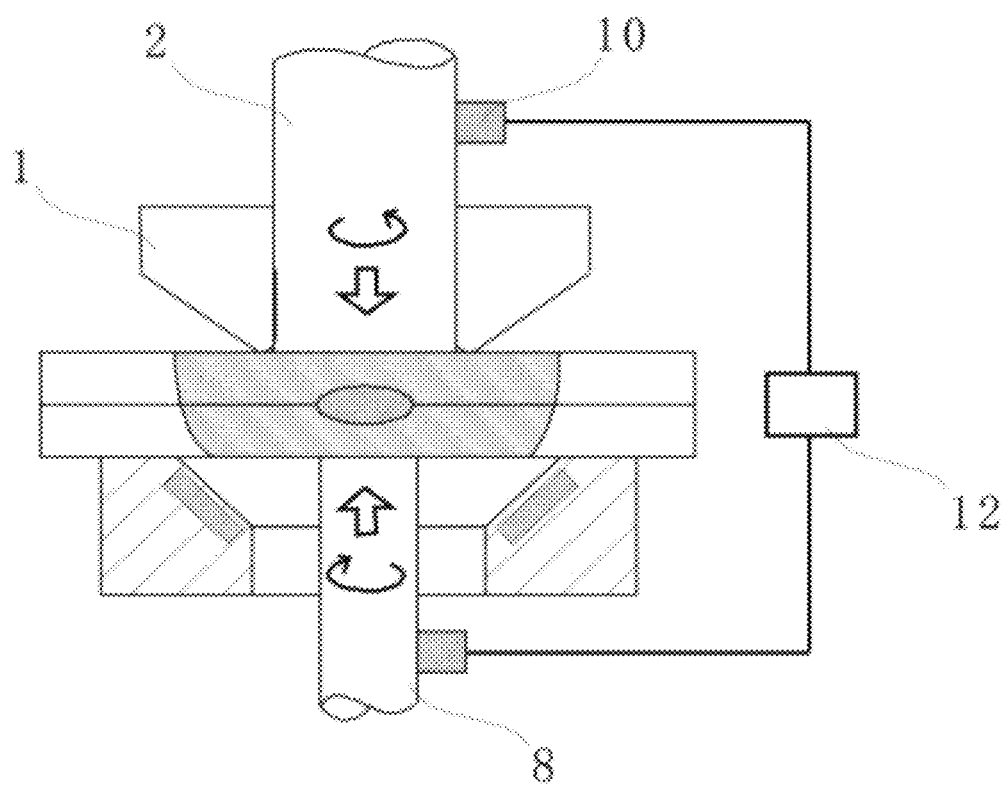
FIG. 3 is a structural diagram of connection of a first stirring head, a second stirring head and a power supply.
Figure 4:
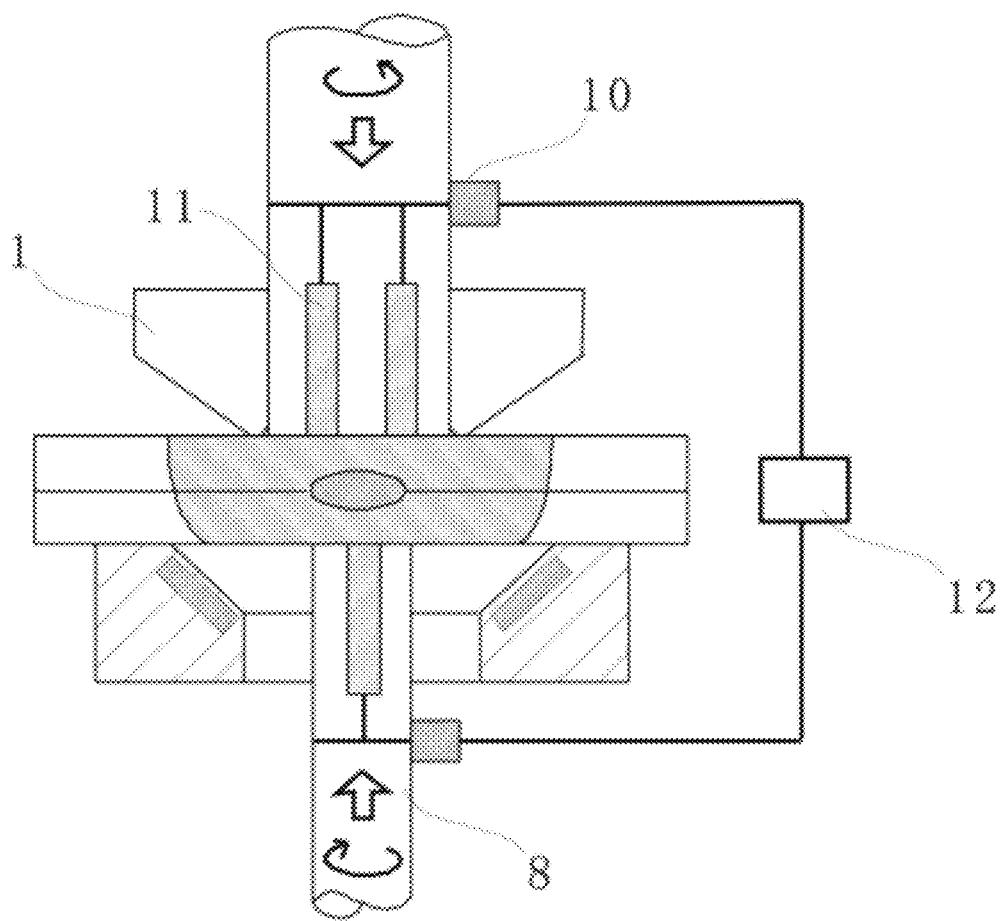
FIG. 4 is a structural diagram of installation of electrodes.
Figure 5:
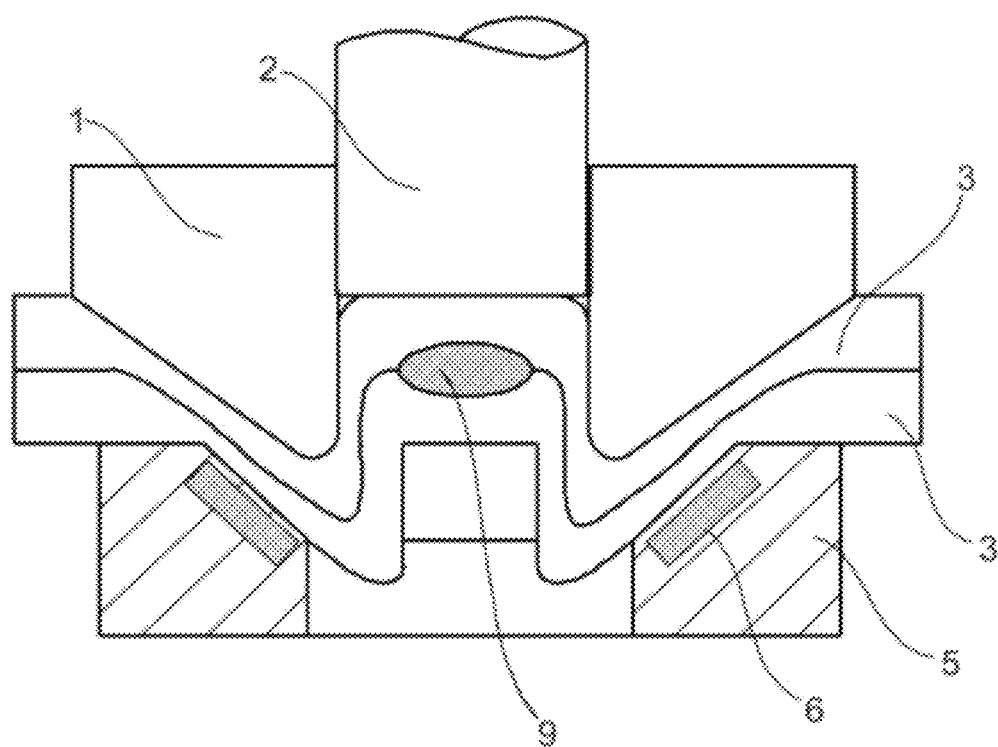
FIG. 5 is a structural diagram of an extrusion hot forming area of an upper die body.
Figure 6:
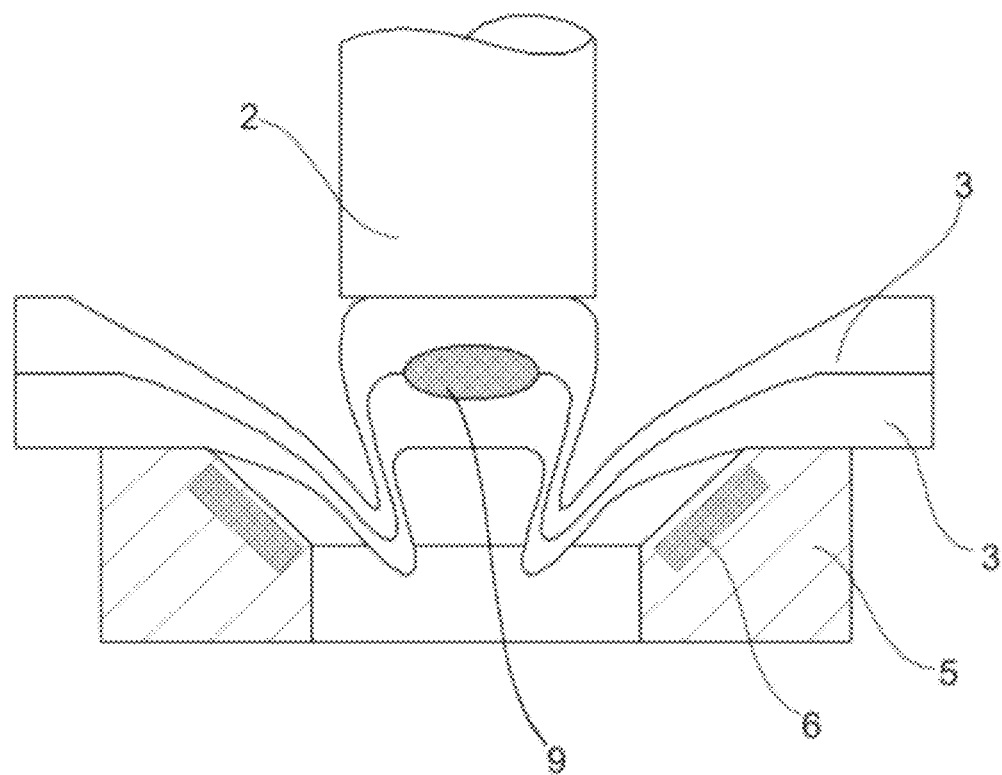
FIG. 6 is a structural diagram of electromagnetic coil extrusion.
Figure 7:
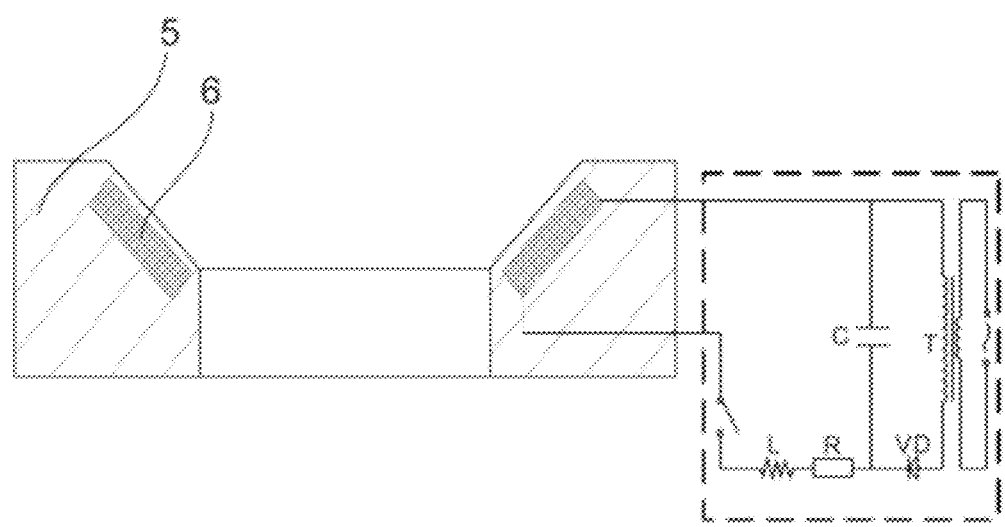
FIG. 7 is a structural diagram of a circuit of an electromagnetic coil.

As shown in FIG. 1 to FIG. 7, an electromagnetic pulse-aided friction stir lock welding processing device in the solution comprises an upper die body 1 and a lower die body 5; the upper end of the lower die body 5 is provided with a frustum-shaped settling tank 7; the settling tank 7 is a big-end-up structure; the lower end of the upper die body 1 is provided with a tip inserted into the settling tank 7; an outer wall of the tip is fitted with an inner wall of the settling tank 7; a gap for placing parts to be processed is arranged between the upper die body 1 and the lower die body 5; the middle of the upper die body 1 is provided with a first stirring head 2; the first stirring head 2 penetrates through a first through hole formed in the middle of the upper die body 1; the middle of the settling tank 7 is provided with a second stirring head 8; the second stirring head 8 penetrates through a second through hole formed in the lower die body 5 and extends into the settling tank 7; the end part of the second stirring head 8 is flush with the height of upper surface of the lower die body 5; the first stirring head 2 and the first through hole are in clearance fit and the second stirring head 8 and the second through hole are in clearance fit; and the side wall of the settling tank 7 is symmetrically provided with electromagnetic coils 6, and the electromagnetic coils 6 are connected with a power supply circuit.

The power supply circuit comprises a transformer T and a capacitor C which are connected with each other in parallel; both ends of the capacitor C are connected with the electromagnetic coils 6; a resistor R, an inductor L and a discharge switch are arranged between the capacitor C and the electromagnetic coils 6; and a diode VD is arranged between the transformer T and the capacitor C.

The size of the first stirring head 2 is greater than the size of the second stirring head 8; the second stirring head 8 and the first stirring head 2 are respectively installed on a second rotating device and a first rotating device; the second rotating device and the upper die body 1 are respectively arranged on a lifting device; and rotation directions of the second stirring head 8 and the first stirring head 2 are opposite.

Electrodes 11 are arranged in the second stirring head 8 and the first stirring head 2; the electrodes 11 are connected with a power supply 12 through wires; the wires are connected with the second stirring head 8 and the first stirring head 2 through an electric brush 10; and the electric brush 10 is installed on a surface connected with the second stirring head 8 and the first stirring head 2. The two stirring heads are energized, and the formation of the nugget is promoted through electric heating to prevent the stirring heads from wearing in energizing.

A processing method using the electromagnetic pulse-aided friction stir lock welding processing device comprises the following steps:

S1: placing two stacked metal plates 3 to be processed on the upper end of the lower die body 5, making a predetermined processing point located above the settling tank 7, and making the upper die body 1, the first stirring head 2 and the second stirring head 8 come into contact and extrude the metal plates 3;

S2: driving the second stirring head 8 and the first stirring head 2 to rotate at set speed V, and making the rotation directions of the second stirring head 8 and the first stirring head 2 opposite;

S3: under the friction and extrusion action of the first stirring head 2 and the second stirring head 8, forming a heat-affected zone 4 between the two metal plates 3 through a heating effect, forming a nugget 9 at the center of the heat-affected zone 4, and connecting the two metal plates 3 by the nugget 9;

The step S3 comprises:

S31: under the friction and extrusion action of the first stirring head 2 and the second stirring head 8, forming a heat-affected zone 4 between the two metal plates 3 through a heating effect, and forming a nugget 9 at the center of the heat-affected zone 4;

S32: shooting thermal imaging photos of the metal plates 3 by a thermal imaging camera at set time t;

S33: evenly dividing the photos into a plurality of sub-photos, and calculating the temperature value $T_n$: $T_n = (t_1+t_2+ \ldots +t_a)/a$ corresponding to each sub-photo by using the temperature value $t_n$ corresponding to each pixel in the photo, wherein a is the number of pixels contained in each sub-photo and $t_a$ is the temperature value corresponding to each pixel in each sub-photo;

S34: finding a maximum temperature value $T_{nmax}$ of the temperature values corresponding to all the sub-photos; taking a center of the sub-photo corresponding to the maximum temperature value $T_{nmax}$ as an origin o which is the center of the nugget 9; and establishing a coordinate system xoy on a plane where the photo is located;

S35: setting minimum heating temperature $T_1$ at which the metal plates 3 form a satisfactory nugget 9; comparing the temperature value $T_n$ corresponding to all the sub-photos with minimum temperature $T_1$; if $T_n \geq T_1$, determining that the nugget 9 can be formed at a region of the sub-photo; and if $T_n < T_1$, determining that the nugget 9 cannot be formed at the region of the sub-photo;

S36: screening out sub-photos that the nugget 9 can be formed, and marking the positions of the sub-photos that the nugget 9 can be formed in the coordinate system xoy to form a nugget 9 region that takes the origin o as a starting point and diffuses to a periphery;

S37: connecting the centers of the outermost sub-photos in the nugget 9 region to form a closed nugget 9 region pattern, and acquiring coordinates of the center of each sub-photo at the boundary of the nugget 9 region pattern in the coordinate system xoy to obtain a coordinate group $A=\{(x_1, y_1), (x_2, y_2), \ldots, (x_b, y_b)\}$ for calculating the area of the nugget 9 region pattern, wherein b is the number of the sub-photos distributed at the boundary of the nugget 9 region pattern;

S38: calculating the area S of the nugget 9 region pattern by using the coordinate group A: wherein i is any coordinate in the coordinate group A;

S39: comparing the area S with a threshold S of the area of the nugget 9 required by the processing;

if $S \geq S_{threshold}$, determining that a stable nugget 9 is formed between the two metal plates 3 and processing requirements are satisfied; and executing step S4;

if $S < S_{threshold}$, determining that an unstable nugget 9 is formed between the two metal plates 3 and the processing requirements are not satisfied; increasing the extrusion pressure of the first stirring head 2 and the second stirring head 8 on the two metal plates 3, or increasing the rotational speed of the first stirring head 2 and the second stirring head 8; returning to step S31; and promoting the formation of a nugget 9 which satisfies the processing requirements between the two metal plates 3.

S4: driving the upper die body 1 to decline by the lifting device; under the extrusion action of the upper die body 1, producing plastic deformation by the two metal plates 3; and squeezing the heat-affected zone 4 into the settling tank 7 until the metal in the heat-affected zone 4 fills the settling tank 7;

S5: in the deformation process of the two metal plates 3, forming a convex lock welding structure through the thimble action of the second stirring head 8, wherein the inner surface of the convex lock welding structure is a cylindrical structure;

S6: then, driving, by the lifting device, the second stirring head 8 to draw out the settling tank 7; raising the upper die body 1 to leave the settling tank 7; after the capacitor C is fully charged by the transformer, instantaneously closing the discharge switch; discharging to the electromagnetic coils 6 by the capacitor C so that transient alternating current is produced and flows through the electromagnetic coils 6; and producing a strong alternating magnetic field;

S7: generating induced current opposite to the current of the electromagnetic coils 6 on the surfaces of the metal plates 3 by the strong alternating magnetic field; generating an induced magnetic field by the induced current to prevent the magnetic field of the electromagnetic coils 6 from penetrating through the metal plates 3; generating time-dependent mutually exclusive magnetic field forces between the electromagnetic coils 6 and the metal plates 3; and generating a repulsive force among the electromagnetic coils 6 and both sides of the lower end of the convex lock welding structure so that the lower end of the convex lock welding structure is rapidly deformed and furled inwards to form a mechanical lock welding structure.

The present invention firstly makes the two metal plates 3 produce plastic deformation through extrusion in a mode of frictional heating to form a preliminary lock welding structure, and then uses the mutual magnetic field force between the electromagnetic coils 6 and the metal plates 3 to form a stable lock welding structure. In the process of frictional heating, the nugget 9 is formed between the two metal plates 3. The present invention uses the thermal imaging principle to monitor the forming process of the nugget 9 in real time to ensure that the area formed by the nugget 9 meets the design requirements, and adjusts a frictional state according to the monitoring results so that processing accuracy is high, the mechanical properties of the lock welding structure is obviously improved, and high connection strength, easy control, high efficiency and simple operation are achieved.

The above shows and describes the basic principle and main features of the present invention and the advantages of present invention. For those skilled in the art, apparently, the present invention is not limited to details of the above demonstrative embodiments. Moreover, the present invention can be realized in other specific forms without departing from the spirit or basic feature of the present invention. Therefore, in all respects, the embodiments shall be regarded to be demonstrative and non-restrictive. The scope of the present invention is defined by appended claims, rather than the above description. Therefore, the present invention is intended to include all changes falling into the meaning and the scope of equivalent elements of claims within the present invention. Any drawing mark in claims shall not be regarded to limit the concerned claims.

In addition, it shall be understood that although the description is explained in accordance with the embodiments, not every embodiment only includes one independent technical solution. This narration mode of the description is only for clarity. Those skilled in the art shall regard the description as a whole, and the technical solution in each embodiment can also be appropriately combined to form other embodiments understandable for those skilled in the art.

The invention claimed is:

1. An electromagnetic pulse-aided friction stir lock welding processing device, comprising an upper die body and a lower die body, wherein the upper end of the lower die body is provided with a frustum-shaped settling tank; the settling tank is a big-end-up structure; the lower end of the upper die body is provided with a tip inserted into the settling tank; an outer wall of the tip is fitted with an inner wall of the settling tank; a gap for placing parts to be processed is arranged between the upper die body and the lower die body; the middle of the upper die body is provided with a first stirring head; the first stirring head penetrates through a first through hole formed in the middle of the upper die body; the middle of the settling tank is provided with a second stirring head; the second stirring head penetrates through a second through hole formed in the lower die body and extends into the settling tank; the end part of the second stirring head is flush with the height of upper surface of the lower die body; the first stirring head and the first through hole are in clearance fit and the second stirring head and the second through hole are in clearance fit; and the side wall of the settling tank is symmetrically provided with electromagnetic coils, and the electromagnetic coils are connected with a power supply circuit;

the power supply circuit comprises a transformer T and a capacitor C which are connected with each other in parallel; both ends of the capacitor C are connected with the electromagnetic coils; a resistor R, an inductor L and a discharge switch are arranged between the capacitor C and the electromagnetic coils; and a diode VD is arranged between the transformer T and the capacitor C;

a size of the first stirring head is greater than a size of the second stirring head;

the second stirring head and the first stirring head are respectively installed on a second rotating device and a first rotating device; the second rotating device and the upper die body are respectively arranged on a lifting device; and rotation directions of the second stirring head and the first stirring head are opposite;

electrodes are arranged in the second stirring head and the first stirring head; the electrodes are connected with a power supply through wires; the wires are connected with the second stirring head and the first stirring head through an electric brush; and the electric brush is installed on a surface connected with the second stirring head and the first stirring head;

the method comprises the following steps:

S1: placing two stacked metal plates to be processed on the upper end of the lower die body, making a predetermined processing point located above the settling tank, and making the upper die body, the first stirring head and the second stirring head come into contact and extrude the metal plates;

S2: driving the second stirring head and the first stirring head to rotate at set speed V, and making the rotation directions of the second stirring head and the first stirring head opposite;

S3: under the friction and extrusion action of the first stirring head and the second stirring head, forming a heat-affected zone between the two metal plates through a heat effect, forming a nugget at the center of the heat-affected zone, and connecting the two metal plates by the nugget;

wherein the step S3 comprises:

S31: under the friction and extrusion action of the first stirring head and the second stirring head, forming a heat-affected zone between the two metal plates through a heat effect, and forming a nugget at the center of the heat-affected zone;

S32: shooting thermal imaging photos of the metal plates by a thermal imaging camera at set time t;

S33: evenly dividing the photos into a plurality of sub-photos, and calculating the temperature value $T_n$: $T_n=(t_1+t_2+ \ldots +t_a)/a$ corresponding to each sub-photo by using the temperature value $t_n$ corresponding to each pixel in the photo, wherein a is the number of pixels contained in each sub-photo and $t_a$ is the temperature value corresponding to each pixel in each sub-photo;

S34: finding a maximum temperature value $T_{nmax}$ of the temperature values corresponding to all the sub-photos; taking a center of the sub-photo corresponding to the maximum temperature value $T_{nmax}$ as an origin o which is the center of the nugget; and establishing a coordinate system xoy on a plane where the photo is located;

S35: comparing the temperature value $T_n$ corresponding to all the sub-photos with minimum temperature $T_1$ according to minimum heating temperature $T_1$ at which the metal plates form a satisfactory nugget; if $T_n \geq T_1$, determining that the nugget can be formed at a region of the sub-photo; and if $T_n < T_1$, determining that the nugget cannot be formed at the region of the sub-photo;

S36: screening out sub-photos that the nugget can be formed, and marking the positions of the sub-photos that the nugget can be formed in the coordinate system xoy to form a nugget region that takes the origin o as a starting point and diffuses to a periphery;

S37: connecting the centers of the outermost sub-photos in the nugget region to form a closed nugget region pattern, and acquiring coordinates of the center of each sub-photo at the boundary of the nugget region pattern in the coordinate system xoy to obtain a coordinate group $A=\{(x_1, y_1), (x_2, y_2), \ldots, (x_b, y_b)\}$ for calculating the area of the nugget region pattern, wherein b is the number of the sub-photos distributed at the boundary of the nugget region pattern;

S38: calculating the area S of the nugget region pattern by using the coordinate group A:

$$S = \frac{1}{2}\sum_{i=1}^{b} x_i(y_{i+1} - y_{i-1})$$

wherein i is any coordinate in the coordinate group A;

S39: comparing the area S with a threshold S of the area of the nugget required by the processing;

if $S \geq S_{threshold}$, determining that a stable nugget is formed between the two metal plates and processing requirements are satisfied; and executing step S4;

if $S < S_{threshold}$, determining that an unstable nugget is formed between the two metal plates and the processing requirements are not satisfied; increasing the extrusion pressure of the first stirring head and the second stirring head on the two metal plates, or increasing the rotational speed of the first stirring head and the second stirring head; returning to step S31; and promoting the formation of a nugget which satisfies the processing requirements between the two metal plates;

S4: driving the upper die body to decline by the lifting device; under the extrusion action of the upper die body, producing plastic deformation by the two metal plates; and squeezing the heat-affected zone into the settling tank until the metal in the heat-affected zone fills the settling tank;

S5: in the deformation process of the two metal plates, forming a convex lock welding structure through the thimble action of the second stirring head, wherein the inner surface of the convex lock welding structure is a cylindrical structure;

S6: then, driving, by the lifting device, the second stirring head to draw out the settling tank; raising the upper die body to leave the settling tank; after the capacitor C is fully charged by the transformer, instantaneously closing the discharge switch; discharging to the electromagnetic coils by the capacitor C so that transient alternating current is produced and flows through the electromagnetic coils; and producing a strong alternating magnetic field; and S7: generating induced current opposite to the current of the electromagnetic coils on the surfaces of the metal plates by the strong alternating magnetic field; generating an induced magnetic field by the induced current to prevent the magnetic field of the electromagnetic coils from penetrating through the metal plates; generating time-dependent mutually exclusive magnetic field forces between the electromagnetic coils and the metal plates; and generating a repulsive force among the electromagnetic coils and both sides of the lower end of the convex lock welding structure so that the lower end of the convex lock welding structure is rapidly deformed and furled inwards to form a mechanical lock welding structure.

\* \* \* \* \*